358-140. XR 3,493,677 SR

Feb. 3, 1970 T. O. PAINE 3,493,677

ACTING ADMINISTRATOR OF THE NATIONAL AERONAUTICS AND SPACE ADMINISTRATION

TELEVISION SIGNAL SCAN RATE CONVERSION SYSTEM

Filed Oct. 23, 1968

TX 528

X 505

Phillip C. Lipoma
Harold E. Te Poel
INVENTORS

BY [signature]
M J. Marnock
ATTORNEYS

United States Patent Office 3,493,677

Patented Feb. 3, 1970

3,493,677

TELEVISION SIGNAL SCAN RATE CONVERSION SYSTEM

T. O. Paine, Acting Administrator of the National Aeronautics and Space Administration, in respect to an invention of Phillip C. Lipoma, Dickinson, Tex., and Harold E. Te Poel, Erie, Colo.

Filed Oct. 23, 1968, Ser. No. 769,788

Int. Cl. H04n 5/76

U.S. Cl. 178—6.6 10 Claims

ABSTRACT OF THE DISCLOSURE

Slow scan television signals are converted into standard fast scan television signals by using the slow scan signals to reproduce the television pictures on a monitor type television set. These slow pictures are intermittenlty scanned at the standard fast scan rate by means of a standard television camera. The signal generated by the camera during each fast scan is supplied to magnetic recorder apparatus as well as to the system output terminal. The magnetic recorder apparatus is operative intermediate the fast scan intervals to play back the recorded signal a sufficient number of times to fill in the gap between the fast scan intervals. These playback signals are supplied to the system output terminal to provide at such terminal a continuous fast scan type television signal.

BACKGROUND OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

This invention relates to television signal conversion systems for converting television signals having a first set of scanning parameters into television signals having a second set of scanning parameters.

The Apollo program of the National Aeronautics and Space Administration will send men to the moon for purposes of exploring the surface environment thereof. Such program will include a television system for communicating back to earth live television pictures of the astronauts during their journey to the moon and during their exploration on the moon.

Because of bandwidth and power limitations, the planned Apollo television system will utilize scanning parameters which are not compatible with the standard television scanning parameters. In the Apollo system, each individual television image will be composed of 320 horizontal lines and the images will be formed at a rate of 10 images or frames per second in a non-interlaced manner. In the standard broadcast television system in use in the United States, each complete picture image is composed of 525 horizontal lines and the complete pictures are generated at the rate of 30 frames per second using a 2:1 interlacing technique. This latter technique involves the generation of two partial frames or "fields" for each complete picture, these fields being generated at a rate of 60 per second. The first field of each picture contains the odd numbered picture lines and the second field contains the even numbered picture lines or visa versa.

Various conversion systems have been heretofore proposed for use in converting television signals produced in accordance with the standards of one country into television signals in accordance with the standards of another country. Two basic approaches have been heretofore proposed. One involved the use of multiple picture storage tubes, while the other involves the use of a single picture storage tube employing a "read-while-write" technique.

A problem with the multiple storage tube proposal is that it is almost impossible to obtain two or more different storage tubes which have exactly identical operating characteristics. This results in serious shading, flicker and misregistration problems when the different storage tubes are activated to produce their respective portions of a continuous television signal. Also, the circuitry required for this approach is extremely complex and difficult to operationally set up and maintain.

A problem with the single storage tube approach is that the decay time for the stored signal must be long enough to provide information for continuous read-out for the duration of the incoming television frame time. It also must be short enough to provide adequate erasure of the old frame of television information prior to the storage of a new frame of information. To compensate for the decay of the stored signal while it is being continuously read out of the storage tube, the read out circuits must include a line-to-line variable gain amplifier whose gain is varied in a manner to compensate for the decay. As the signal decays and the gain of such amplifier is increased, the noise content of the output signal is increased, thus degrading the quality of the output signal. Also, in actual practice, the desired decay characteristics cannot be achieved for the storage tube photosensitive storage elements and hence a portion of the previous frame of picture information will remain thereon when the next frame of picture information is stored. This produces a sticky or smeared picture when the storage tube signals are subsequently used to produce pictures on a television set.

SUMMARY OF THE INVENTION

It is an object of the invention, therefore, to provide a new and improved television signal conversion system which substantially avoids one or more of the limitations of the heretofore proposed systems.

It is another object of the invention to provide a new and improved television signal conversion system for converting a first television signal format into a second television signal format where the vertical scanning rates in the two formats are several times different from one another.

It is a further object of the invention to provide a new and improved television signal conversion system for converting non-interlaced television signals into interlaced television signals.

It is an additional object of the invention to provide a new and improved television signal conversion system for converting slow scan television signals from a spacecraft into television signals which are suitable for display on a standard broadcast type of television receiver.

In accordance with the invention, a television signal conversion system for converting slow scan television signals into fast scan television signals comprises means responsive to a slow scan television signal for reproducing successive frames of a slow scan television picture at its slow scan rate. Such system also comprises means for rapidly scanning each reproduced frame to produce a television signal corresponding thereto at a fast scan rate. The system further comprises means for repeating a given fast scan television signal until the next frame of the slow scan picture is ready to be scanned at the fast scan rate.

For a better understanding of the present invention, together with other and further objects and features thereof, reference is had to the following description taken into connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENTS

Figures 1, 2:
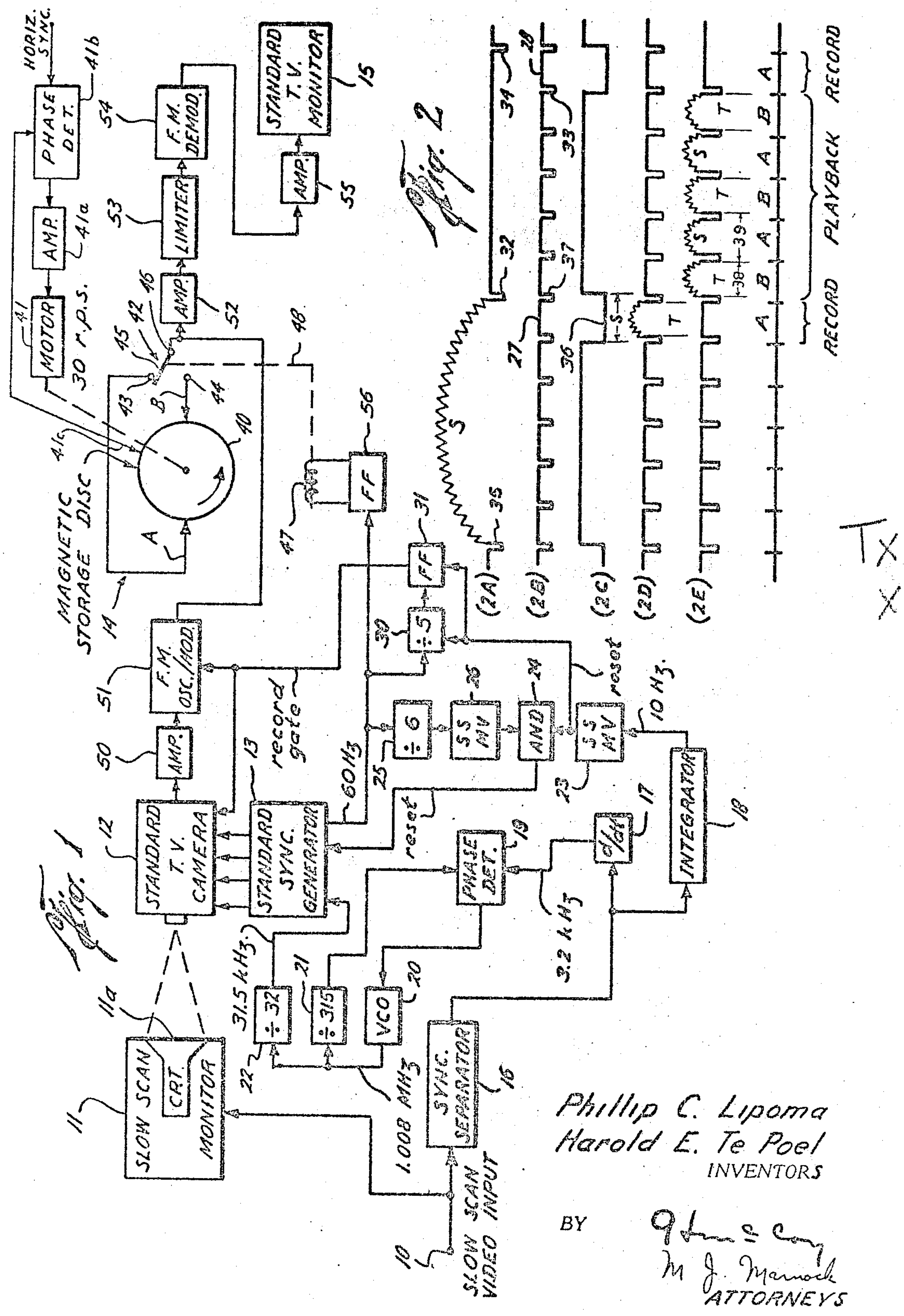
FIG. 1 is a block type schematic diagram of a television signal conversion system constructed in accordance with the present invention.
FIG. 2 is a timing diagram showing signal waveforms produced at different points in the FIG. 1 system.

When used in connection with the Apollo space program, the television signal conversion system of the present invention will normally be located at the ground station which is receiving the various signals being transmitted from the spacecraft. The purpose of the conversion system is to convert the slow scan Apollo television signal into a fast scan television signal corresponding to the standard United States television broadcasting requirements. This enables the converted signal to be displayed by the various standard broadcast type television receivers and monitors presently in use at the various NASA facilities and control centers. It also enables the converted spacecraft television signals to be relayed directly to commercial broadcast stations for purposes of broadcasting to the general public.

Before proceeding further, it is necessary to explain the meaning of the term "frame" as used herein. With an interlaced type of television signal, the television receiver reproduces two partial pictures in quick succession. One of these partial pictures contains the odd numbered horizontal lines, while the other contains the even numbered horizontal lines. In American engineering practice, each partial picture is called a "field" and the complete picture is called a "frame." Thus, each "frame" is composed of two "fields." In British engineering practice, the partial pictures are referred to as "frames" and the complete pictures is referred to as a "picture." Thus, in the British system each "picture" is composed of two "frames." In a non-interlaced system, such as the Apollo system, only complete pictures are reproduced by a television receiver operating in accordance with the non-interlaced standards. Thus there is only one "field" or "frame" per complete picture. In order to avoid confusion in discussion the interlaced and non-interlaced signals and pictures which are involved in the present invention, the British terminology will be used. Therefore, as used herein, and in the appended claims, the term "frame" refers to the picture image or to the picture signal produced during one vertical scanning interval regardless of whether an interlaced or a non-interlaced system is being discussed.

Referring now to FIG. 1 of the drawings, an incoming slow scan video signal is supplied by way of an input terminal 10 to a slow scan monitor 11. This monitor 11 reproduces on the display screen 11*a* of a cathode ray tube (CRT) contained therein the pictures being conveyed by the incoming television signal. For sake of an example, it is assumed that the slow scan signal is a non-interlaced signal having 320 horizontal lines per frame and 10 frames per second. Thus, the electron beam in the cathode ray tube of the monitor 11 traces out the horizontal lines of the picture at a rate of 3200 lines per second. Each frame of 320 lines is produced during one vertical scanning interval as the electron beam progresses from the top to the bottom of the display screen 11*a*, these frame intervals or vertical scanning intervals occurring at the rate of 10 per second.

A standard broadcast type of television camera 12 is focused on the display screen 11*a* of the slow scan monitor 11. This produces an electron image of the monitor picture on the target structure contained in the camera tube of camera 12. This target structure is scanned in a line-by-line manner by the electron beam contained in the camera tube to thereby generate a video output signal corresponding to the scene being viewed by the camera. This scanning process in the camera 12 is controlled by a standard broadcast type or sync generator 13. For sake of an example, it will be assumed that this scanning is being performed in accordance with the United States standard of 525 horizontal lines per complete picture and 30 complete pictures per second with 2:1 interlacing. Because of the 2:1 interlacing, the electron beam in the camera tube of camera 12 moves from the top to the bottom of the image at a rate of 60 times per second and during each such trip traces out a series of 262 ½ lines. Thus, the sync generator 13 generates and supplies to the camera 12 vertical scanning signals at a frequency of 60 hertz and horizontal scanning signals at a frequency of 15.75 kilohertz. The generator 13 also supplies to the camera 12 the customary synchronizing and blanking pulses.

The primary factor to be considered is the different vertical scanning rates in the monitor 11 and the camera 12. The monitor 11, running at a vertical scanning frequency of 10 hertz, takes one-tenth of a second to build up a complete picture. The camera 12, on the other hand, running at a vertical scanning frequency of 60 hertz, can accomplish a complete image scan in $\frac{1}{60}$ of a second. Thus the camera 12 is six times faster.

If the camera 12 were allowed to generate a continuous output signal in its normal manner and if such signal was applied to a television monitor set, the successive images reproduced on the monitor display screen would be composed of varying proportions of earlier and later slow scan frames.

In order to prevent this from occurring, the vertical scanning action of the camera 12 is locked in step with the vertical scanning action of the monitor 11 so that one out of every six vertical scans in the camera 12 constitutes a scanning of a single complete frame or picture on the display screen 11*a* of monitor 11. Then, only these every sixth camera scans are used to provide the desired fast scan television signal. This, however, leaves a time gap of $\frac{5}{60}$ of a second (five camera vertical scan intervals) between the successive usable fast scans of the camera 12. In order to fill in these time gaps, each usable fast scan signal portion is supplied to and recorded by a magnetic recorder apparatus indicated generally at 14 in FIG. 1. This recorder apparatus 14 then operates to play back or repeat the usable fast scan signal a series of five times. These five repeated fast scan signals are used to fill in the time gap between the original fast scan signal and the next usable fast scan signal. This produces a continuous type of fast scan television signal which is effective to continuously produce television images on a standard broadcast type of television receiver or monitor, such as the monitor indicated at 15 in FIG. 1.

The resulting pictures produced on such a monitor 15 will have a pleasing and completely normal looking appearance, except for scenes having an object which is undergoing relatively fast movement across the scene. In the latter case, such movement will appear to occur in short, quick jumps instead of in a smooth continuous manner. The noticeablensss of this effect, however, is relatively slight and the picture remains of a pleasing or acceptable nature of the viewer.

In order to lock the standard sync generator 13 in step with the scanning action in the monitor 11, the slow scan video signal which is driving the monitor 11 is also supplied to a sync separator 16. Sync separator 16 separates the synchronizing pulse portion of the slow scan signal from the picture information portion of the slow scan signal. The separated synchronizing pulses are supplied to a differentiating circuit 17 and an integrator circuit 18. The former effectively separates out the 3.2 kilohertz horizontal scanning synchronizing pulses and the latter effectively separates out the 10 hertz vertical scanning synchronizing pulses.

The 3.2 kilohertz horizontal sync pulses appearing at the output of the differentiating circuit 17 are supplied to a first input of a phase detector circuit 19. A voltage controlled oscillator 20 oscillating at a nominal frequency of 1.008 megahertz supplies pulses to a frequency divider or pulse counter 21 which counts down the oscillator pulses by a factor of 315:1. This produces 3.2 kilohertz pulses at the output of the counter 21. These pulses are supplied to a second input of the phase detector 19. If the two sets of 3.2 kilohertz pulses supplied to the phase detector 19 are not in both frequency and phase synchronism with one another, then an error voltage is developed by the phase detector 19 and is supplied to the voltage control terminal of the voltage controlled oscillator 20. Such error voltage adjusts the frequency and phase of the oscillator 20 until the output of the divider or counter 21 is brought into synchronism with the 3.2 kilohertz pulses derived from the slow scan signal. This locks the pulses of voltage controlled oscillator 20 in step with the 3.2 kilohertz slow scan horizontal sync pulses. Two trains of pulses are said to be locked in step when each of the lower frequency pulses is made to coincide with one of the higher frequency pulses. There will of course be a larger number of higher frequency pulses so that additional ones of such higher frequency pulses will occur intermediate those which coincide with the lower frequency pulses.

The 1.008 megahertz pulses generated by the voltage controlled oscillator 20 are also supplied to a frequency divider or pulse counter 22 which divides or counts down by a ratio of 32:1. The resulting pulses at the output of counter 22 have a repetition frequency of 31.5 kilohertz These pulses are supplied to the 31.5 kilohertz pulse generator circuit contained in the sync generator 13 for locking this generator circuit in step with the voltage controlled oscillator 20. Since both the incoming slow scan horizontal sync pulses and the 31.5 kilohertz pulse generator circuit are locked in step with the oscillator 20, they are locked relative to one another. This locking prevents the different trains of pulses from shifting or moving with respect to one another.

The 31.5 kilohertz pulse generator circuit located in sync generator 13 drives a pair of pulse counters located in generator 13, one of which divides by two and the other of which divide by 525. The "divide-by-two" counter produces output sync pulses having a repetition frequency corresponding to the standard 15.75 kilohertz horizontal scanning frequency. The "divide-by-525" counter produces output sync pulses having a repetition frequency corresponding to the standard 60 hertz vertical scanning frequency.

Since the 60 hertz standard scan vertical sync pulses developed in the generator 13 are derived from the 31.5 kilohertz generator circuit in unit 13, this means that such 60 hertz vertical sync pulses will be fixed in time relative to both the horizontal and vertical sync pulses of the slow scan video signal. This does not mean, however, that any of the 60 hertz pulses will coincide with any of the 10 hertz slow scan vertical sync pulses. It only prevents one of these sets of pulses from shifting or moving with respect to the other.

In order to cause every sixth one of the 60 hertz standard scan vertical sync pulses to coincide with the 10 hertz slow scan vertical sync pulses, these two sets of pulses are compared to produce, whenever necessary, a reset pulse for resetting the vertical 525:1 pulse counter in the generator 13. This produces the desired coincidence. To this end, the 10 hertz vertical sync pulses appearing at the output of the integrator 18 are supplied to a single shot multivibrator 23. Such multivibrator 23 produces 10 hertz output pulses of fixed duration and well-defined shape which are in step with the 10 hertz pulses from the integrator 18. These pulses are supplied to a first input of an EXCLUSIVE OR circuit 24. The 60 hertz pulses generated in the sync generator 13 are supplied to a frequency divider or pulse counter 25 which counts down by a 6:1 ratio. This produces 10 hertz output pulses which are used to trigger a single shot multivibrator 26. The multivibrator 26 produces output pulses of fixed duration and well-defined shape which are in step with every sixth 60 hertz pulse supplied by the sync generator 13. These pulses from the multivibrator 26 are supplied to a second input of the EXCLUSIVE OR circuit 24.

One of the sets of pulses supplied to the EXCLUSIVE OR circuit 24 is complemented or inverted within the EXCLUSIVE OR circuit 24 relative to the other. In particular, multivibrator 23 supplies positive-going pulses, while multivibrator 26 supplies negative-going pulses. As a consequence, EXCLUSIVE OR circuit 24 will not produce an output pulse if the two sets of input pulses are in step with one another. If, on the other hand, the two sets of pulses are not in step with one another, then each time this lack of coincidence occurs the positive-going one of these pulses is passed by the EXCLUSIVE OR circuit 24 and supplied to the vertical counter in the sync generator 13 for use as a reset pulse. This resets the vertical counter which is producing the 60 hertz pulses which, in turn, brings the two sets of pulses supplied to the EXCLUSIVE OR circuit 24 back into step with one another.

This bringing into step produces the relative pulse timing relationships depicted by waveforms 2A and 2B of FIG. 2. The negative-going pulses in waveform 2A represent the 10 hertz slow scan vertical sync pulses as they appear at the system input terminal 10, while the negative-going pulses of waveform 2B represent the 60 hertz vertical sync pulses produced by the standard sync generator 13. The 10 hertz vertical sync pulses represented in waveform 2A define the time boundaries of the vertical scans of the monitor 11. The 60 hertz vertical sync pulses represented in waveform 2B define the time boundaries of the vertical scans of the camera 12.

As previously indicated, it is desired to use only the video signal which is generated by the camera 12 during every sixth one of the vertical scanning intervals of the camera 12. The desired vertical scanning intervals are the ones represented at 27 and 28 in waveform 2B. They are the terminal or last fast scan vertical scanning interval occurring during each of the slow scan vertical scanning intervals. The idea is to wait until the slow scan interval is almost finished and then to start the fast scan operation so that both scanning operations end up being finished at the same time. In this way, the fast scan picture information will be exactly the same as one complete frame of slow scan picture information, without delay.

In order to cause the camera 12 to produce an output signal only during the terminal fast scan vertical intervals, a record gate signal is generated by units 30 and 31 and supplied to the camera 12. This record gate signal keeps the electron beam doing the scanning in the camera 12 turned off during all but the desired vertical scanning intervals. The waveform for this gate signal is represented by waveform 2C of FIG. 2. The low level portions of waveform 2C represent the time intervals during which the camera beam is turned on, while the high level portions represent the time intervals when the beam is turned off.

To produce this record gate signal, the 10 hertz pulses produced by the single shot multivibrator 23 are supplied to the rest terminals of each of the units 30 and 31. At the same time, the 60 hertz pulses produced by the sync generator 13 are supplied to a counting input terminal of the unit 30. Unit 30 is a "divide-by-five" frequency divider or pulse counter, while unit 31 is a bistable flip flop circuit. The output of the counter 30 is connected to the "set" input terminal of the flip flop 31. In terms of waveforms 2A–2C, the trailing edge of one of the positive-going 10 hertz pulses from multivibrator 23 which is coincident in time with pulse 32 of waveform 2A operates to reset each of the units 30 and 31. This produces the high level output from the flip flop 31 (waveform 2C). Immediately thereafter, the counter 30 begins to count the 60 hertz pulses represented by waveform 2B. The counting of the fifth one of these 60 hertz pulses causes the counter 30 to produce an output pulse. This is supplied to the flip flop 31 and places it in its set condition. This produces the next low level portion of waveform 2C. This low-level condition prevails until the occurrence of the next 10 hertz pulse, which pulse is coincident in time with pulse 34 in waveform 2A. The trailing edge of this 10 hertz pulse is effective to reset the units 30 and 31, thus terminating the low-level output from unit 31.

Note that the width of the active portion ("beam on" portion) of the record gate signal of waveform 2C corresponds to one standard scan frame of picture information preceded and followed by a standard vertical sync pulse. Since the trailing edge of the 10 hertz pulse is used to trigger the trailing edge of the gate signal active portion, the width of the 10 hertz pulse supplied by the multivibrator 23 should be the same as the width of the standard vertical sync pulse.

The selected picture information signals generated by the camera 12 are supplied to the magnetic recorder 14. Such apparatus 14 includes magnetic storage means in the form of a disc 40 whose edge is coated with a layer of magnetic recording material. Disc 40 is rotated at a speed of 30 revolutions per second by a motor 41, a closed loop servo system comprised of amplifier 41*a*, phase detector 41*b*, and tachometer 41*c* controlled by horizontal sync. Magnetic recording heads A and B are placed in operative relationship with the layer of magnetic material at locations which are spaced almost 180 degrees apart around the edge of disc 40. As is customary, heads A and B can be used for either recording or playback.

The record/playback head A is connected to a switch 42, which, for simplicity of explanation, is represented as a relay type switch. In the present state of the art, a relay type switch would be too slow. Thus, in actual practice, switch 42 will take the form of a high speed electronic or solid state switching circuit. Keeping in mind that this assumed simplication is being used, the head A is connected to a first input terminal or contact 43 of the switch 42. The record/playback head B is connected to a second input terminal or contact 44 of the switch 42. Switch 42 also includes a movable switch blade 45 which is electrically and mechanically connected to an output terminal or contact 46. The switch 42 also includes a relay coil 47 and an armature member represented by dash-line 48 for causing the switch blade 45 to move back and forth between the stationary contacts 43 and 44. (Coil 47 and armature member 48 correspond in function to the control signal circuitry of the actual electronic switching circuit.)

Video signals from the camera 12 are supplied by way of an amplifier 50 to a frequency modulation (FM) type oscillator/modulator unit 51. The FM oscillator/modulator 51 produces an FM output signal whose frequency varies in proportion to the amplitude variations in the video signal supplied to the input of such unit 51. This FM signal is supplied by way of the switch 42 to one of the record/playback heads A and B (e.g., head A). This causes an FM type of recording of the video information on the magnetic disc 40. After it is recorded on the disc 40, the video information is played back in a repetitive maner by means of both of the heads A and B and the switch 42. These playback reproductions are supplied by way of the switch 42 to an amplifier 52 which, in turn, supplies these playback signals by way of a limiter 53 to a frequency modulation (FM) demodulator 54. Demodulator 54 operates to restore the video signals to their original amplitude modulation form. Thus, the video signals appearing at the output of the demodulator 54 are of the same form as those supplied to the input of the oscillator/modulator unit 51. These signals are then supplied by way of an output amplifier 55 to the standard television monitor 15.

In order to obtain the desired repetitive playback action, the relay coil 47 of the switch 42 is driven by a flip flop circuit 56 which, in turn, is driven by the 60 hertz vertical sync pulses produced by the standard sync generator 13. This causes the switch blade 45 of the switch 42 to engage contact 43 during one standard vertical scanning interval and to engage contact 44 during the next standard vertical scanning interval. This back and forth process continues in step with the successive vertical scanning intervals.

In order to prevent the oscillator/modulator unit 51 from erasing a signal recorded on the magnetic disc 40, such oscillator/modulator 51 is disabled or turned off by means of the record gate signal during the same time intervals that the electron beam of camera 12 is turned off.

The timing relationships for the recording and the playback of the video signal information by the recording apparatus 14 can best be seen with the aid of the waveforms of FIG. 2. Waveform 2A represents a slow scan television video signal as it appears at the signal conversion system input terminal 10. For sake of simplicity, the slow scan horizontal sync pulses have been omitted from waveform 2A and one complete frame of slow scan picture information, indicated at S in waveform 2A, is shown as occupying the entire vertical scanning interval intermediate the successive vertical sync pulses 35 and 32. For simplicity of explanation, it is further assumed that no picture information is transmitted during the preceding and succeeding scanning intervals (i.e., it is assumed that the video signal is at the black level during such preceding and succeeding vertical scan intervals).

This frame length of picture information depicted at S will produce one complete picture image on the display screen 11*a* of the slow scan monitor 11. When the monitor vertical scanning action is one-sixth of the way from the bottom of the monitor image, the scanning beam in the camera 12 is turned on by the low-level portion of the record gate signal indicated at 36 in waveform 2C. This causes the camera 12 to make a rapid line-by-line type scanning of the monitor display screen 11*a*. This rapid scanning is completed at the same moment that the slow scan monitor beam completes the bottom line of the slow scan image. The resulting output signal from the camera 12 is represented at S in waveform 2D. It contains the same picture information as was contained in the original slow scan video signal of waveform 2A. The only difference is that the time scale has been compressed by a factor of six.

As this video signal is being generated by the camera 12, it is at the same time supplied to the FM oscillator/modulator 51 which, in turn, records an FM representation thereof on the recording surface of the disc 40, this being done by way of the head A (assuming that switch blade 45 is initially in the upper position). The speed of rotation of the disc 40 is such that the disc 40 makes more than one-half of a revolution recording vertical sync, one field of video, and vertical sync information as indicated at S in waveform 2D. This is necessary to synthesize interlace. The FM replica signal which is being supplied to the head A for recording purposes is at the same time supplied by way of amplifier 52 and limiter 53 to the FM demodulator 54 to produce a signal corresponding to waveform 2D at the output of demodulator 54. This provides the first fast scan output frame which is supplied to the monitor 15.

As soon as this fast scan vertical scanning interval and vertical sync is completed, the flip flop 56 is operated by the fast scan vertical sync pulse indicated at 37 in waveform 2B to place the switch blade 45 in engagement with the contact 44 which is connected to the head B. The FM oscillator/modulator 51 is thereupon and thereafter turned off by the record gate signal to prevent the erasing of this recorded video information. The recorder 14 is now in the playback mode. In other words, whenever the oscillator/modulator 51 is turned off, the amplifier 52 is able to read whatever recorded information is passing under the record/playback head to which it happens to be connected, which is active video only for head B.

Since the magnetic disc 40 makes one-half of a revolution during the course of one fast scan vertical scanning interval, the previously recorded length of video information T now begins to appear under the head B. This information is then supplied by way of the switch blade 45 to the amplifier 52 during the next fast scan vertical scanning interval. This produces the first playback of the fast scan video information frame T, such playback being indicated at 38 in waveform 2E. Waveform 2E depicts the output signal produced at the output of FM demodulator 54 as a consequence of the playback of signals recorded on the magnetic disc 40. When this first playback is completed, the disc 40 has made one complete revolution and the recorded information is now ready to begin passing under the head A. Switch blade 45 is thereupon switched back to the first contact 43 to enable the amplifier 52 to detect this passage and thereby produce the second playback of the fast scan video frame S. Such second playback is indicated at 39 in waveform 2E. This playback process is repeated, the switch blade 45 alternating back and forth between switch contacts 43 and 44, until a total of five playbacks have been produced for the video frame S.

At this moment, it is time to again turn on the scanning beam in the camera 12 to make the next fast scan of the image on the display screen 11*a* of the monitor 11. This next frame of fast scan video information is then supplied to the oscillator/modulator 51 which operates to replace the previous length of video information recorded on the disc 40 by this new length of video information. After recording of the new information, the playback process is again repeated.

The intermittent fast scan plus the repeated or multiple playbacks thereof between such intermittent fast scans serves to produce a continuous type of television signal at the output of the amplifier 55.

One additional matter needs to be discussed, namely, the interlacing feature. With the FIG. 1 system, interlacing is automatically accomplished by the accurate mechanical placement of the two record/playback heads A and B of the recording apparatus 14. In particular, the heads A and B are spaced apart around the edge of the disc 40 by an angular distance of 180 degrees plus or minus ½ of a fast scan horizontal line interval. In other words, the angular rotation from head A to head B is 180 degrees plus ½ a horizontal line interval, while the angular rotation from head B back to head A is 180 degrees minus ½ a horizontal line interval (or vice versa). In other words, the head placement differs from 180 degrees by an angular amount which, when taking into account the speed of rotation of the disc 40, represents the length or span of ½ of a horizontal line interval of recorded picture information on the edge of the disc 40. This ½ line interval difference represents the difference between one "field" to the next in an interlaced system.

The continuous, interlaced, standard broadcast type television signal appearing at the output of amplifier 55 can, if desired, be supplied to a relatively large number of standard type television monitors located in different locations by means of an appropriate signal distribution system. Also, it can be supplied to a television transmitting station for wireless transmission to various remote locations.

Various modifications of the signal conversion system of FIG. 1 can be made. For example, it can be shown that the system will work equally as well even if the sync locking circuits are omitted from the system. In other words, unit 16–24 and 26 of FIG. 1 could be omitted and the scan conversion system would still operate satisfactorily, provided that the output of the divider circuit 25 is used to supply the reset signals to the units 30 and 31.

Another modification of the present system is to let the standard television camera 12 be turned on during the first fast scan interval for each slow scan image, as well as for the last or terminal fast scan interval of each slow scan image. This is possible because of the fact that the slow scan scanning beam and the fast scan scanning beam are coincident at the bottom end of the slow scan image interval. Since the beams are in step at this instant and since the fast scan beam is moving at a faster rate, it can be left turned on for the first fast scan interval of the next slow scan image. When this is done, the fast scan beam makes an undisturbed second scan of the previous slow scan image because the slower moving slow scan beam (which is starting to produce the second slow scan image) will never catch up with it. Thus, two consecutive interlaced frames ("fields") of fast scan video can be produced for each slow scan image. Since this video information is fully interlaced, one of the recording heads of the magnetic recorder 14, as well as the switch 42, can be omitted, the remaining head being connected directly to both the oscillator/modulator 51 and the amplifier 52.

A problem exists with this "one head" modification, however, in that the second scan of video information derived from any given slow scan image is reduced in amplitude with respect to the first scan derived from such image. Also, the shading characteristics of the second scan are somewhat different from the first scan. These differences produce undesired flicker in the television images produced by a fast scan television signal generated in this manner. This problem cannot be overcome by simply increasing the gain of the amplifier 50.

A signal conversion system constructed in accordance with the present invention is mechanized in such a way that the incoming slow scan video information is processed through a single channel of electronics, thus avoiding the problems of a multiple storage tube system as previously discussed. Also, the near destructive read-out of the standard television vidicon camera avoids the problems inherent with a single storage tube "read-while-write" system. A further advantage is that the present system will, in fact, work with a standard television camera, thus eliminating the need for special purpose storage tubes.

While the signal conversion system has been described in terms of a particular slow scan video format, the system can be readily modified to accept different slow scan video formats. This is accomplished by changing the scanning frequencies in the slow scan monitor 11, and the operating frequencies, count-down ratios and circuit time constants of the sync lock circuits 16–26 to accommodate the scanning parameters of the different slow scan format. By providing adjustable circuit elements for these circuits, the signal conversion system can be made into a more or less universal television signal converter which will convert a wide variety of slow scan video formats to the standard broadcast video format. Also, it is to be understood that other kinds of magnetic recording apparatus can be used in practicing this invention.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A television signal conversion system for converting slow scan television signals into fast scan television signals comprising:

- means responsive to a slow scan television signal for reproducing successive frames of a slow scan television picture at its slow scan rate;
- means for rapidly scanning each reproduced frame to produce a television signal corresponding thereto at a fast scan rate;
- means for repeating a given fast scan television signal until the next frame of the slow scan picture is ready to be scanned at the fast scan rate, said means for repeating including recording and playback means; and circuit means for intermittently supplying a length of television camera video signal to the recording and playback means.

2. A television signal conversion system in accordance with claim 1 wherein the means for reproducing comprises a television monitor and the means for rapidly scanning comprises television camera apparatus.

3. A television signal conversion system in accordance with claim 1 wherein the means for repeating comprises magnetic signal storage apparatus for recording each fast scan television signal and playing it back a plurality of times.

4. A television signal conversion system in accordance with claim 2 wherein the means for repeating comprises magnetic signal storage apparatus for recording each fast scan television signal and playing it back a plurality of times.

5. A television signal conversion system in accordance with claim 4 wherein the magnetic signal storage apparatus includes a magnetic recording medium, a pair of spaced apart playback heads and switching means for switching back and forth between the two playback heads to provide the plurality of fast scan television signal playbacks.

6. A television signal conversion system for converting slow scan television signals into fast scan television signals comprising:

a slow scan television monitor for receiving a slow scan television signal and reproducing each slow scan picture frame in a line by line manner;

a television camera focused on the display screen of the slow scan monitor;

sync generator means for operating the television camera at a fast vertical scanning rate such that a plurality of fast vertical scans will be produced for each vertical scan of the slow scan monitor;

magnetic recording and playback means for repetitively reproducing a length of video signal supplied thereto;

circuit means for intermittently supplying a length of the television camera video signal to the magnetic recording and playback means, each new length replacing the previous length, these lengths being generated during the terminal fast scan intervals of the slow scan frame reproductions;

and output circuit means responsive to the video signal lengths reproduced by the magnetic recording and playback means for providing a continuous fast scan television signal.

7. A television signal conversion system in accordance with claim 6 which also includes sync lock means for locking the sync generator means in synchronism with the vertical scanning sync pulses of the slow scan television signal such that the slow scan vertical sync pulses coincide with some of the fast scan vertical scanning sync pulses.

8. A television signal conversion system in accordance with claim 6 wherein the magnetic recording and playback means includes a magnetic recording medium, a plurality of spaced apart record-playback heads, means for moving the recording medium past the heads and switching means for switching between the different heads to provide the repetitively reproduced video signal lengths.

9. A television signal conversion system in accordance with claim 8 wherein the record-playback heads are provided with a spacing relative to one another which causes the repetitively reproduced video signal lengths to be of an interlaced character.

10. A television signal conversion system in accordance with claim 8 wherein the output circuit means is also responsive to the intermittent video signal lengths generated by the television camera, the operation of the recording and playback means being timed so that the video signal lengths reproduced by such means fill up the time intervals intermediate the intermittent camera generated video signal lengths.

References Cited

UNITED STATES PATENTS

| | | | |
|---|---|---|---|
| 2,895,005 | 7/1959 | Kock et al. | |
| 3,109,892 | 11/1963 | Helsdon. | |
| 3,294,902 | 12/1966 | Maxey. | |
| 3,391,248 | 7/1968 | Hirota. | |
| 3,401,299 | 9/1968 | Crowell | 178—6.8 |

JOHN W. CALDWELL, Primary Examiner

D. E. STOUT, Assistant Examiner

U.S. Cl. X.R.

178—6.8